United States Patent

Mason, Jr. et al.

[11] Patent Number: 5,978,371
[45] Date of Patent: Nov. 2, 1999

[54] COMMUNICATIONS MODULE BASE REPEATER

[75] Inventors: Robert T. Mason, Jr.; Ted H. York, both of Raleigh, N.C.

[73] Assignee: ABB Power T&D Company Inc., Raleigh, N.C.

[21] Appl. No.: 08/828,539

[22] Filed: Mar. 31, 1997

[51] Int. Cl.⁶ .................... H04L 12/28; H04L 12/56
[52] U.S. Cl. .................... 370/389; 370/279; 370/315; 370/379
[58] Field of Search .................... 370/279, 315, 370/364, 389, 395, 397, 399, 400, 402, 421, 423, 501, 320, 278, 282, 293, 312, 378, 379, 382, 383, 392; 340/505, 870.02; 455/90, 402; 395/702, 82, 824, 825, 800.35, 566, 559

[56] References Cited

U.S. PATENT DOCUMENTS

| | | | |
|---|---|---|---|
| 3,611,201 | 10/1971 | Goell | 333/18 |
| 3,702,460 | 11/1972 | Blose | 340/150 |
| 3,911,415 | 10/1975 | Whyte | 340/310 |
| 3,942,168 | 3/1976 | Whyte | 340/310 |
| 3,962,547 | 6/1976 | Pattantyus-Abraham | 179/2.5 |
| 3,967,264 | 6/1976 | Whyte et al. | 340/310 |
| 3,973,087 | 8/1976 | Fong | 179/170 |
| 3,973,240 | 8/1976 | Fong | 340/151 |
| 4,004,110 | 1/1977 | Whyte | 179/170 |
| 4,008,467 | 2/1977 | Pattantyus-Abraham et al. | 340/310 |
| 4,016,429 | 4/1977 | Vercellotti et al. | 307/149 |
| 4,024,528 | 5/1977 | Boggs et al. | 340/310 |
| 4,032,911 | 6/1977 | Melvin, Jr. | 340/310 |
| 4,130,874 | 12/1978 | Pai | 364/514 |
| 4,156,866 | 5/1979 | Miller | 340/146.1 |
| 4,210,901 | 7/1980 | Whyte et al. | 340/310 |
| 4,250,489 | 2/1981 | Dudash et al. | 340/147 |
| 4,270,206 | 5/1981 | Hughes | 375/9 |
| 4,292,546 | 9/1981 | Clark | 307/114 |
| 4,302,750 | 11/1981 | Wadwani et al. | 340/870.02 |
| 4,307,464 | 12/1981 | Hughes | 375/67 |
| 4,348,582 | 9/1982 | Budek | 219/483 |
| 4,357,598 | 11/1982 | Melvin, Jr. | 340/310 |
| 4,427,968 | 1/1984 | York | 340/310 |
| 4,467,314 | 8/1984 | Weikel et al. | 340/310 |
| 4,471,399 | 9/1984 | Udren | 361/64 |
| 4,475,209 | 10/1984 | Udren | 375/4 |
| 4,500,837 | 2/1985 | Shuey et al. | 324/102 |
| 4,527,247 | 7/1985 | Kaiser et al. | 364/550 |
| 4,551,780 | 11/1985 | Canay | 361/113 |
| 4,556,865 | 12/1985 | Fukagawa et al. | 340/310 |
| 4,599,598 | 7/1986 | Komoda et al. | 340/310 |
| 4,628,443 | 12/1986 | Rickard et al. | 364/184 |
| 4,628,503 | 12/1986 | Grams et al. | 370/85 |
| 4,638,298 | 1/1987 | Spiro | 340/827 |
| 4,645,956 | 2/1987 | Shuey | 307/562 |
| 4,668,934 | 5/1987 | Shuey | 340/310 |
| 4,675,668 | 6/1987 | Ise et al. | 340/825.08 |
| 4,686,382 | 8/1987 | Shuey | 307/149 |
| 4,692,761 | 9/1987 | Robinton | 340/825.01 |
| 4,697,166 | 9/1987 | Warnagiris et al. | 340/310 |
| 4,703,306 | 10/1987 | Barritt | 340/310 |
| 4,746,897 | 5/1988 | Shuey | 340/310 |
| 4,749,992 | 6/1988 | Fitzemeyer et al. | 340/870.02 |
| 4,755,792 | 7/1988 | Pezzolo et al. | 340/538 |
| 4,756,009 | 7/1988 | Braun et al. | 375/86 |
| 4,760,375 | 7/1988 | Stecker | 340/310 |
| 4,763,104 | 8/1988 | Inoue et al. | 340/310 |
| 4,766,414 | 8/1988 | Shuey | 340/310 |
| 4,774,716 | 9/1988 | Hagmann | 375/83 |
| 4,800,363 | 1/1989 | Braun et al. | 340/310 |
| 4,809,296 | 2/1989 | Braun et al. | 375/1 |
| 4,815,106 | 3/1989 | Propp et al. | 375/36 |
| 4,835,517 | 5/1989 | van der Gracht et al. | 340/310 |
| 4,841,281 | 6/1989 | Melvin, Jr. | 340/310 |
| 4,847,781 | 7/1989 | Brown, III et al. | 364/492 |
| 4,890,089 | 12/1989 | Shuey | 340/310 |
| 4,899,129 | 2/1990 | MacFadyen et al. | 340/310 |
| 4,899,217 | 2/1990 | MacFadyen et al. | 358/86 |
| 4,914,418 | 4/1990 | Mak et al. | 340/310 |
| 4,918,690 | 4/1990 | Markkula, Jr. et al. | 370/94 |
| 4,937,569 | 6/1990 | Trask et al. | 370/501 |
| 4,962,496 | 10/1990 | Vercellotti et al. | 370/11 |
| 4,969,146 | 11/1990 | Twitty et al. | 370/85.1 |
| 4,980,665 | 12/1990 | Schotz | 340/310 |
| 5,034,882 | 7/1991 | Eisenhard et al. | 364/200 |
| 5,049,872 | 9/1991 | Yamanaka et al. | 340/825.05 |
| 5,065,150 | 11/1991 | Machida et al. | 340/825.06 |
| 5,086,385 | 2/1992 | Launey et al. | 364/188 |
| 5,090,024 | 2/1992 | Vander Mey et al. | 375/1 |
| 5,097,249 | 3/1992 | Yamamoto | 340/310 |
| 5,101,191 | 3/1992 | Macfadyen et al. | 340/310 |

| | | | |
|---|---|---|---|
| 5,151,838 | 9/1992 | Dockery | 340/310 |
| 5,175,677 | 12/1992 | Kushiro et al. | 364/140 |
| 5,185,591 | 2/1993 | Shuey | 340/310 |
| 5,198,796 | 3/1993 | Hessling, Jr. | 340/310 |
| 5,218,354 | 6/1993 | Hess | 340/826 |
| 5,218,552 | 6/1993 | Stirk et al. | 364/492 |
| 5,268,666 | 12/1993 | Michel et al. | 455/402 |
| 5,289,158 | 2/1994 | Neves | 340/309.15 |
| 5,385,297 | 1/1995 | Rein et al. | 236/49.3 |
| 5,391,932 | 2/1995 | Small et al. | 307/125 |
| 5,402,419 | 3/1995 | Osakabe et al. | 370/392 |
| 5,404,127 | 4/1995 | Lee et al. | 340/310.02 |
| 5,424,587 | 6/1995 | Federowicz | 307/140 |
| 5,424,710 | 6/1995 | Baumann | 340/310.01 |
| 5,428,351 | 6/1995 | Lee, Jr. et al. | 340/870.02 |
| 5,430,663 | 7/1995 | Judd et al. | 364/550 |
| 5,434,558 | 7/1995 | Zeder | 340/568 |
| 5,442,335 | 8/1995 | Cantin et al. | 340/825.71 |
| 5,448,229 | 9/1995 | Lee, Jr. | 340/870.02 |
| 5,452,291 | 9/1995 | Eisenbandler et al. | 370/402 |
| 5,455,761 | 10/1995 | Kushiro et al. | 364/140 |
| 5,459,459 | 10/1995 | Lee, Jr. | 340/870.02 |
| 5,471,190 | 11/1995 | Zimmerman | 340/310.01 |
| 5,475,363 | 12/1995 | Suzuki et al. | 340/506 |
| 5,495,235 | 2/1996 | Durinovic-Johri et al. | 340/825.31 |
| 5,495,239 | 2/1996 | Quellette | 340/505 |
| 5,537,549 | 7/1996 | Gee et al. | 395/200.54 |
| 5,579,523 | 11/1996 | Tanaka | 395/726 |
| 5,598,406 | 1/1997 | Albrecht et al. | 370/296 |
| 5,699,276 | 12/1997 | Roos | 364/514 |
| 5,736,965 | 4/1998 | Mosebrook et al. | 455/90 |
| 5,748,104 | 5/1998 | Argyroudis et al. | 370/320 |
| 5,839,097 | 11/1998 | Klausner | 340/825.06 |

*Primary Examiner*—Dang Ton
*Assistant Examiner*—Phirin Sam
*Attorney, Agent, or Firm*—Woodcock Washburn Kurtz Mackiewicz & Norris LLP

[57] ABSTRACT

A repeater communications module (RCM) that enhances signals in a communications network comprises a processor coupled to a communications medium and optionally to a host application. The RCM operates in one of two modes: (1) interface or host application controlled, and (2) standalone. In the interface mode, the RCM receives packets from a host application, modifies the packets and transmits message packets in accordance with a transmit role table (TRT). In standalone mode, the RCM initiates packets and transmits message packets in accordance with the TRT. All RCMs can be configured to repeat message packets which are received from the communications medium in accordance with a repeater role table (RRT).

26 Claims, 3 Drawing Sheets

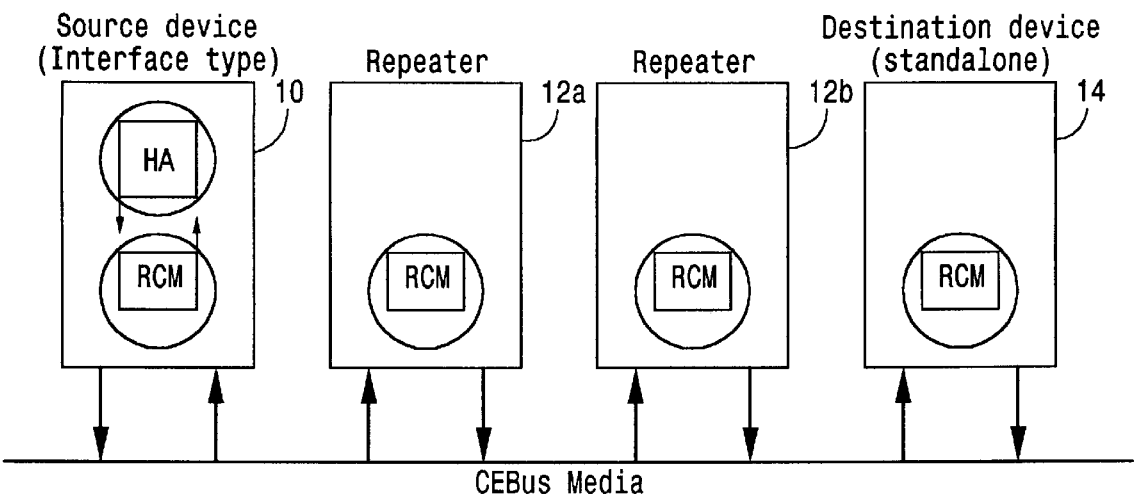
FIG. 1
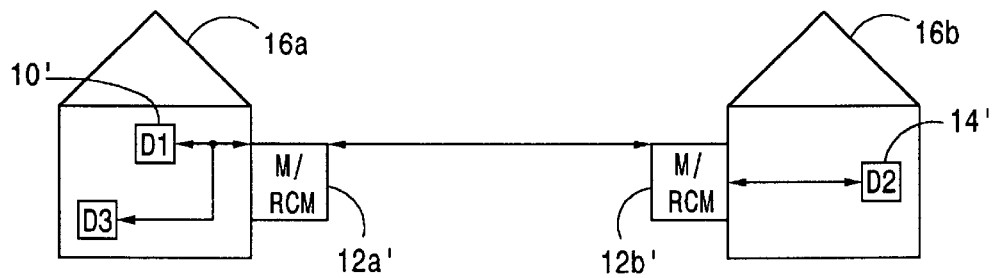
FIG. 2
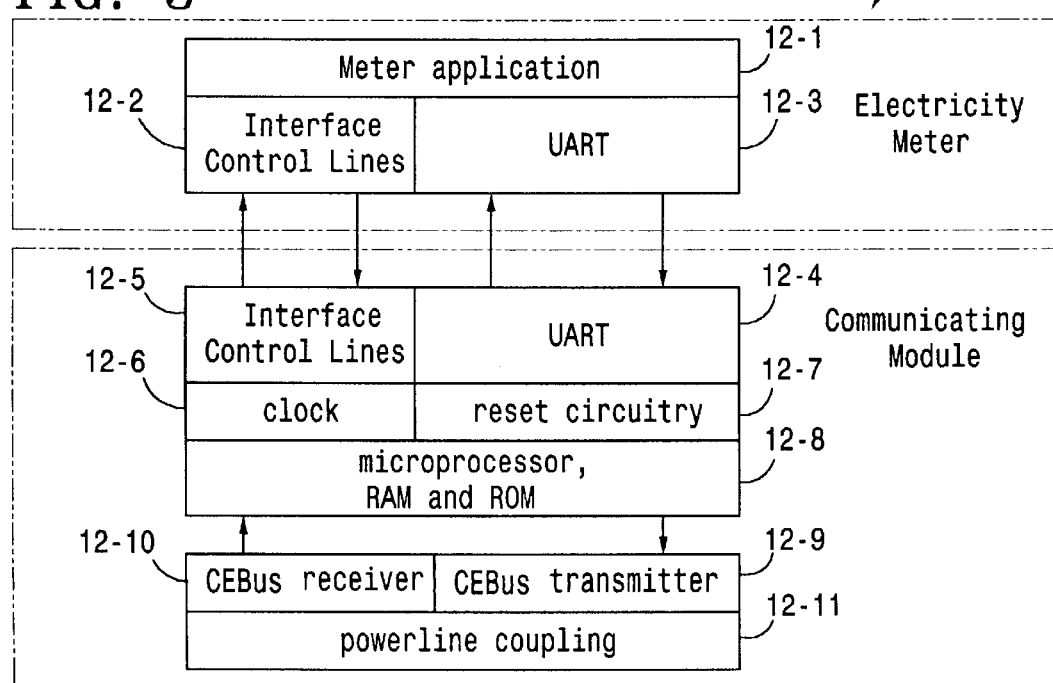

4
COMMUNICATIONS MODULE BASE REPEATER

FIELD OF THE INVENTION

The present invention relates generally to the field of inter-device communications, and more particularly to a communications module and related method for use in a communications network, and still more particularly to a communications module that is configurable to operate as an interface between a host application and a CEBus network, a repeater in a CEBus network, and a standalone device in a CEBus network.

BACKGROUND OF THE INVENTION

It is desirable for electrical and electronic devices to communicate and share information. A need has existed, e.g., for electronic communications between and among products such as data terminals, remote printers, personal computers, entertainment systems, refrigerators, washers, dryers, lights, and security and temperature control systems, all of which may be located within a single facility. Various schemes have been proposed to facilitate such inter-device communications, including radio transmission, light transmission and dedicated communications networks. It has been suggested in the past that such communications can be efficiently accomplished utilizing in situ power distribution networks. For example, U.S. Pat. No. 4,697,166 to Warnagiris et al. describes the ANI PLC (Power Line Carrier) system for inter-element communications.

As recognized in U.S. Pat. No. 5,471,190 to Zimmermann, there has been a growing interest in communications networks for home automation systems and products to facilitate the interconnection of lights, appliances, sensors and control devices. One system, critically described in the Zimmermann patent, was the so-called X-10 system. Eventually, an industry standard known as CEBus (Consumer Electronics Bus) was adopted by the Electronics Industries Association (EIA). The CEBus protocol (EIA IS-60) relates to a local area network that uses multiple media, including power line, radio, twisted pair, coaxial cable, and infrared signaling. The current CEBus protocol is designed to provide reliable communications within a single residence over one or more physical media.

The CEBus protocol provides for signal routers and brouters to interface between media; however, it does not provide for a repeater function when signals are unable to propagate successfully from point to point on an individual communications medium. This is a problem since communications media are not always sufficiently reliable to complete every desired point to point communication. Moreover, there are applications in which it is desirable to communicate not only within one residence but also between two or more residences. For communications between two different residences, point to point reliability is drastically reduced from that of the standard single residence scenario. Signal attenuation and noise may both contribute to this lack of reliability. This may be aggravated by distances or by the nature of the media. One example is an application that requires communication beyond a single family residence, e.g., between two residences or between one residence and a communicating device located outside the residence. Another example is the case where the communicating device is powered from three-phase service and communications are required across different phases of the power line. In commercial, industrial or multi-residence applications, point to point reliability is drastically reduced from that of the single residence scenario.

A goal of the present invention is to provide a reliable, low cost communications module that is adaptable, or configurable, for use in a number of modes in accordance with its location in a CEBus or similar network. The presently desired modes of operation include a source/interface mode in which the module serves as an interface between a host application and the network, a repeater mode in which the module receives and re-transmits message packets originated by another device and intended for a destination device, and a standalone device mode in which the module serves as a destination device for receiving messages from other devices (although the destination device mode may include the ability to originate messages or perform other application-based functions).

SUMMARY OF THE INVENTION

The present invention provides an apparatus and method for enhancing signals in a CEBus communications network. The repeater aspect of the invention is preferably embodied in a repeater module that offers a number of features and advantages, including a minimal hardware implementation; the ability to configure the communications module to talk through repeaters or to talk directly to a destination device; the ability to configure the communications module to function as a repeater or to ignore packets which are identified as needing to be repeated; a repeater useful with a variety of communications media; the ability to chain multiple repeaters together to achieve long distance communications; the ability of a device to maintain its existing functionality while incorporating the repeater capability; the ability to assign to a repeater selected roles that define what messages to repeat and what modification is to be made to a transmitted message; the ability to establish a complete end-to-end communications path prior to transmission of a message, with each repeater in the transfer being dedicated to only the current transfer; the ability of a repeater to dedicate itself to a transfer between only a specified number of devices at a time by setting a busy filter, with other devices that attempt to use a repeater with a set busy filter being instructed to retry their message(s) at a later time; the ability of a repeater to retry messages that are known to have not reached the next repeater or the end device; and the use of a channel access time of 8 CEBus unit symbol times (USTs) for repeat packets, where the CEBus highest priority packets use an access time of 10 USTs, to ensure that a repeated packet is given the highest possible priority.

A presently preferred embodiment of a repeater communications module (RCM) in accordance with the present invention comprises a processor coupled to a host application and the CEBus media. The processor has access to a transmit role table (TRT) and a repeater role table (RRT). The TRT is employed in connection with messages received from the host application and the RRT is employed in connection with messages received from other devices (including other repeaters) in the network. The processor controls the reception of message packets from the host application, the modification of such message packets to conform the packets to the CEBus protocol, the modification of the CEBus message packets in accordance with the TRT and the transmission of the modified CEBus packets. The processor also controls the reception of CEBus message packets, the modification of CEBus message packets in accordance with the RRT and the retransmission of the CEBus message packets.

The transmit role table comprises a plurality of entries, wherein each entry comprises a Destination House Code, a Destination Device Address, and a Transmit Repeater Role Identifier (TRRI). The Destination House Code and Destination Device Address identify a specific destination device and its house address. The processor is programmed to compare a first field within a packet received from the host application to the destination house codes in the TRT, and to compare a second field within the packet received from the host application to the destination device addresses in the TRT, and to copy the TRRI corresponding to the TRT entry having a matching destination house code and destination device address to an RRI field in the packet, and then to transmit the CEBus packet. The RRI field in the CEBus packet determines whether the packet will be repeated one or more times by another repeater communications module.

The repeater role table, or RRT, comprises a plurality of entries, and each entry comprises a Source House Code, a Source Device Address, a Destination House Code, a Destination Device Address, a Receive Repeater Role Identifier (RRRI) and a Transmit Repeater Role Identifier (TRRI). The Source House Code and Source Device Address identify a specific source device and its house address. The processor is programmed to compare certain fields within the received CEBus packet to the Source House Codes, Source Device Addresses, Destination House Codes, and Destination Device Addresses; to identify an RRT entry having matching source and destination addresses and house codes; to compare an RRI field in the packet to the RRRI in the identified entry; to ignore the packet if the RRI field does not match the RRRI in the identified entry; and, if the RRI field does match the RRRI in the identified entry, to insert the TRRI into the RRI field of the CEBus packet, and to re-transmit the CEBus packet.

In addition, when prompted by a host application, the processor is programmed to perform a so-called Open Pipe procedure. In the presently preferred embodiment of the invention, the Open Pipe procedure reduces the possibility of a source device monopolizing the use of the repeater during retries of long messages that consist of multiple packets. The source device initiates the Open Pipe procedure. The repeaters involved in the transfer of the message from the source device to the destination device, as well as the destination device, respond to the Open Pipe procedure so that a complete communications path is established. The Open Pipe procedure comprises a short, one-packet message used to establish an end-to-end link between the source and destination devices prior to transmission of a multi-packet message. If a response from the destination device is not received when the source device transmits the Open Pipe procedure, transmission of the multi-packet message is not attempted. The time required to retry the one packet Open Pipe procedure is significantly less than the time required to retry long messages with multiple packets, and the time for which the repeaters are unnecessarily held in a busy state is drastically reduced.

Other features and advantages of the present invention are described below.

BRIEF DESCRIPTION OF THE DRAWINGS

FIG. 1 schematically depicts a communications network utilizing repeater communications modules (RCMs) in accordance with the present invention.

FIG. 2 schematically depicts how the inventive RCMs may be employed in association with electricity meters to facilitate CEBus communications between separate residences.

FIG. 3 schematically depicts a combined meter/RCM in accordance with the present invention.

DETAILED DESCRIPTION OF PREFERRED EMBODIMENTS

Figure 4A:
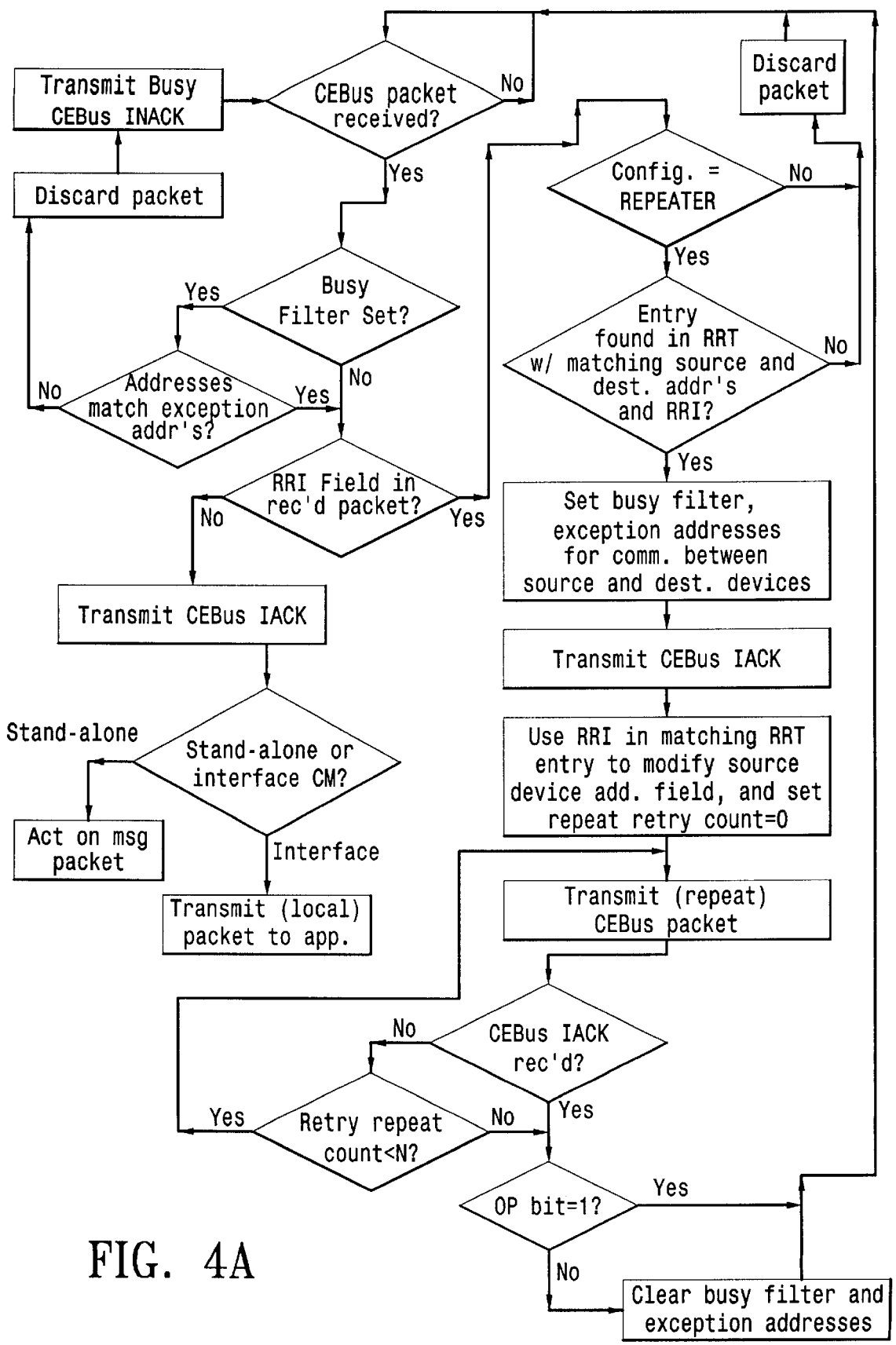
FIGS. 4A and 4B are flowcharts illustrating the operation of a communications module in accordance with the present invention.

As mentioned above, the CEBus protocol does not provide for repeaters. The present invention was designed to provide such repeater capability in a configurable communications module while using existing CEBus protocol structures and without violating CEBus protocol rules. The present invention improves end-to-end communications between two devices by effectively providing a signal boost at a point closer to the destination device. Typical CEBus messages consist of one or more packets. The repeater ("the repeater" refers to the RCM configured to act as a repeater) stores and immediately forwards each packet it is to repeat. A packet transmitted by a CEBus device may now be repeated by one or more repeaters before it reaches the destination device. The inventive communications module may also be configured to function as an interface between the CEBus network and a host application, and as a standalone device.

As shown in FIG. 1, a communications network in accordance with the present invention comprises a source device 10, in this example comprising a host application (HA) controlling a repeater communications module (RCM); a plurality of RCMs 12a and 12b; and a destination device 14, which in this example is a standalone RCM. All of the RCMs transmit or receive message packets to/from a CEBus communications medium. As shown in FIG. 2, the RCMs may be integrated or coupled to electricity meters in the form of combined meter/RCMs 12a' and 12b' associated with residences 16a and 16b, respectively. The example discussed below refers to a source device 10', or D1, in residence 16a and a destination device 14', or D2, in residence 16b.

FIG. 3 is a block diagram of one presently preferred embodiment of an RCM 12. As shown, the presently preferred embodiment of the RCM 12 comprises an electricity meter that includes a meter application 12-1; interface control lines 12-2; and a universal asynchronous receiver-transmitter (UART) 12-3. In addition, the RCM 12 includes a communications module coupled to the meter. The communications module comprises a UART 12-4; interface control lines 12-5; a clock 12-6; reset circuitry 12-7; a microprocessor and its associated RAM and ROM 12-8; a CEBus transmitter 12-9; a CEBus receiver 12-10; and powerline coupling circuitry 12-11.

In the presently preferred embodiment of the invention, the repeater functionality is implemented entirely in firmware of an RCM 12. The firmware may be completely contained within the microprocessor 12-8, and the meter application 12-1 does not need to be aware of the repeating mechanism. An RCM can either be a standalone device or an interface device. A standalone RCM normally contains additional intelligence to perform a desired application task. One example of this type of RCM is an appliance relay which receives CEBus messages that turn on or turn off the appliance. However, a standalone RCM does not necessarily need to perform an application task. Its sole purpose can be to function as a repeater. An advantage of using RCMs that perform application tasks in addition to functioning as a repeater is the reduced number of total devices that must be installed for successful communications.

An RCM which is an interface device is controlled by a host application. In such a case, the host application contains the intelligence required to perform an application task. The RCM receives messages from the host application, converts the messages to the proper protocol and transmits the messages onto the communications medium. Messages received from the communications medium are converted by the RCM into an application protocol and passed to the host application. An example of this is a CEBus RCM attached to a non-CEBus appliance. The RCM acts as a pass-through device, or interface, between the appliance and CEBus, converting between the appliance's native protocol and the CEBus protocol. The meter application with connected CM shown in FIG. 3 is an example of an RCM controlled by a host application.

Either type of RCM can be configured to communicate using repeaters or to communicate directly to a destination device. Either type of RCM can also be configured to be a repeater. If the RCM is controlled by a host application, it will continue to function as the pass-through module for the application device. If an RCM is a standalone device, it can be configured to be a repeater without affecting performance of the RCM's application task. In one CEBus implementation, the RCM in the electricity meter is configured to be a repeater and all other RCMs in a residence are configured not to be repeaters. All RCMs are configured to communicate using repeaters. The combined RCM/electricity meter configuration was chosen because the electricity meter is a 240 V device and its RCM communicates on the power line across both of the 240 V supply lines (L1-L2). 120 V devices communicate between line and neutral (L1-N or L2-N). Field installations have indicated that some residences experience problems communicating between 120 V devices which are powered from different lines (L1 or L2). For example, unreliable communications are more likely to occur when the source device is using L1-N and the destination device is using L2-N. The RCM in the electricity meter was chosen also because it is electrically the entrance point into a residence. When communications are required between two different residences, the respective RCMs in the electricity meters at both residences pass messages into and out of their residence. This is illustrated in FIG. 2, which shows that a message from residence 16a device D1 to residence 16b device D2 is routed through the RCM repeaters 12a', 12b' located in the electricity meters.

With the repeater, the route of a packet is determined by a Repeater Role Identifier (RRI). The RRI is contained in each packet of a message, and specifies which repeater is required to respond to the packet. For the CEBus implementation of the repeater, the RRI is contained in the Source Device Address field. The CEBus protocol contains the following 16-bit address fields: Destination Device Address, Destination House Code, Source Device Address, and Source Device House Code. Bits 12, 13, and 14 in the Source Device Address field are used to specify the repeater role. For clarity, the 16-bit CEBus Source Device Address field is shown in Table 1. A 3-bit RRI field was chosen in this example to satisfy the requirements for successful CEBus communications. For other types of communications media, the RRI field may be larger or smaller based on the specific requirements.

TABLE 1

| CEBus Source Device Address field | | | |
|---|---|---|---|
| Bit 15 | Bits 12–14 | Bit 11 | Bits 0–10 |
| unused | RRI | OP Bit | Actual CEBus Source Device Address |

Table 1: CEBus Source Device Address field

Each RCM configured as a repeater contains a repeater role table (RRT). This table defines how the RCM is to respond to a packet which contains a non-zero RRI. For the CEBus implementation of the repeater, each entry in the RRT includes the Destination Device Address, Destination House Code, Source Device Address, Source House Code, a receive RRI, or RRRI, and a transmit RRI, or TRRI. When a repeater receives a packet containing addresses and an RRI which match an entry in the table, the repeater transmits a CEBus IACK to acknowledge that the packet has been received and will be forwarded, inserts the TRRI into the packet in place of the RRRI, and re-transmits the packet.

A source device is responsible for inserting the correct RRI into the CEBus packet. Each RCM which invokes repeaters contains a transmit role table (TRT) that defines which RRI is to be used for the packet to be transmitted. For the CEBus implementation of the repeater, each entry in this table consists of the Destination Device Address, Destination House Code, and a TRRI. When an RCM has a packet to be sent to a destination device, it uses the Destination Device Address and Destination House Code to determine the TRRI, inserts this TRRI into the Source Device Address field, and then transmits the packet.

Each RCM may be configured to be a repeater or not to be a repeater. RCMs that are configured not to be repeaters will ignore packets containing a non-zero RRI value. Each RCM is also configured to either transmit packets with an RRI inserted (using the TRT) or without an RRI (RRI=0). Packets that can contain an RRI equal to zero are routed directly from the source device to the destination device. The configurable nature of the RCM provides the highest degree of flexibility, allowing for systems to be installed with or without the use of repeaters.

RCMs have a special priority level when retransmitting a CEBus powerline packet. To avoid contention between multiple power line communication packets, CEBus uses a priority scheme that specifies the minimum channel quiet time that must elapse before a device is allowed to transmit. The minimum CEBus quiet time is specified to be 10 Unit Symbol Times (USTs). To give repeat packets the highest priority, a quiet time of 8 USTs is used by the repeater for accessing the CEBus when transmitting repeat packets.

The repeater has the capability to retry each packet if it does not successfully reach the next RCM in the communications chain. The next RCM may be another repeater or it may be a destination device. For the CEBus implementation, successful packet transfer is indicated by the receipt of an Immediate Acknowledge (IACK). If a repeated packet does not receive a CEBus IACK, the repeater will immediately retry the packet one time. If an IACK is not received for the second attempt, the repeater will wait one second and then retry transmission of the packet. This retry is similar to the first attempt in that there is one attempt and one immediate retry if an IACK has not been received. The number of retries is a configurable parameter in the RCM, and can be between, e.g., 0 and 15.

One potential problem with repeaters is that multiple devices may wish to use the same repeater at the same time. This presents a problem if the repeater is only capable of storing and forwarding messages between a limited number of device pairs at the same time. To prevent contention problems, the repeater counts the device pairs it is currently supporting. When the repeater's limit is reached, a busy filter is invoked. In the preferred embodiment, this count is set to one device pair. When a busy filter is set, the addresses of the device pairs that are allowed to communicate through the repeater are known as the exception addresses. If a packet is received and both the source and destination addresses do not match an exception address pair, the repeater will issue an immediate response to the source device indicating that the repeater is busy and the source device should retry the message at a later time. This message is known as a Busy INACK. The Busy INACK specifies to the transmitting device the number of minutes or seconds for which the repeater will remain in a busy state. If the busy filter time is greater than one minute, the repeater will specify the time in minutes. If the busy filter time is less than one minute, the repeater will specify the time in seconds. While the busy filter is set, if the RCM is controlled by a host application, the RCM will also prevent the host application from communicating through the RCM onto the communications medium. If a packet received from the host application requires transmission, the RCM response will indicate to the application that the packet cannot be transmitted at this time. If the RCM receives a packet destined to this RCMs application and the repeat busy filter is set, the RCM will respond with a Busy INACK.

While a repeater is attempting to repeat a packet, it is possible that the source device will transmit the next packet in a message sequence prior to the repeater successfully passing the previous packet to the destination device or to the next repeater. If the repeater is not able to queue multiple packets (i.e., if it can only store and forward one packet at a time), when a second packet is received prior to the successful transfer of the previous packet the repeater will respond with a Failure INACK. This INACK is similar to a Busy INACK in that it tells the source device to retry the message later. However, the Failure INACK is only intended to slow down the source device. For the CEBus implementation, source devices or repeaters that receive a Failure INACK will retry the packet 1–2 seconds later.

When a source device sends a message to a destination device, it typically waits for a response message from the destination device to indicate that the message transfer was successful. If the destination device is not present or is not responding, the source device will typically time out waiting for a response and retry transmission of the message several times. If the message to be sent is a long message consisting of many packets, a substantial amount of time may be spent transferring all of the packets even though there is no response from the destination device. While each packet of the message is being sent, and normally until the busy filter set by the repeater times out, all repeaters in the message sequence remain busy to only the source and destination devices and will issue a busy response to any other device which attempts to communicate through the repeater. For example, referring to FIG. 2, if device D1 is attempting to communicate to device D2 but device D2 is not responding, then both the repeater in residence 16a and the repeater in residence 16b will be set busy, dedicated solely to the transfer between D1 and D2. If at this time device D3 attempts to communicate through the repeater, the repeater will issue a Busy response to D3, preventing D3's communications session.

Open Pipe Procedure

To reduce the possibility of a source device monopolizing the use of the repeater during retries of long messages that consist of multiple packets, the source device, all repeaters in the message path, and the destination device will respond to a special message used to establish the complete communications path. For the purpose of this discussion, this message will be called the Open Pipe procedure. The Open Pipe procedure is a short, one packet message used to establish an end-to-end link between the source and destination devices prior to transmission of a multi-packet message. If a response from the destination device is not received when the source device transmits the Open Pipe procedure, transmission of the multi-packet message is not attempted. The time required to retry the one packet Open Pipe procedure is significantly less than the time required to retry long messages with multiple packets, and the time for which the repeaters are unnecessarily held in a busy state is drastically reduced.

In the CEBus implementation of the repeater, when an RCM receives an Open Pipe procedure to which it is to respond, it sends an IACK to the device that sent the packet, and then repeats the packet. The repeater also sets a busy filter as described above. In each packet, bit 11 of the CEBus Source Device Address field is used as the Open Pipe bit. This bit is set by the RCM of the source device. If the bit in the packet is set, it tells the RCM that there are more packets to follow, and the RCM maintains the busy filter by resetting the busy time. If the Open Pipe bit in a packet to be repeated is clear, the RCM will forward the packet as normal and then clear the busy filter so that the next source/destination device pair may have access to the repeater. RCMs involved in the message transfer as either the source or destination device will set the Open Pipe bit equal to 1 in all packets except the last packet of a response message. The last packet of a response indicates the end of a normal message sequence, and the Open Pipe bit is cleared to indicate that the communications session between the two devices has been completed, and any busy filters which are set may be cleared.

Flowchart Description

The operation of a communications module in accordance with the present invention will now be described with reference to FIGS. 4A and 4B.

Referring first to FIG. 4A, which illustrates the operation of the module in receiving CEBus packets, the module first determines whether a CEBus packet has been received. Once such a packet has been received, the module determines whether its busy filter is set. If so, the module then determines whether the addresses in the packet match the exception addresses. If the busy filter is set and the exception addresses do not match, the packet is discarded and a busy INACK is transmitted. On the other hand, if the exception addresses are matched or if the busy filter is not set, the module determines whether there is an RRI field in the received packet. If the RRI field equals zero, the module transmits a CEBus IACK and then either acts on the message packet (if in stand-alone mode) or transmits a local packet to a host application (if in interface mode).

Alternatively, if the RRI field is present in the packet (does not equal zero), the module determines whether it is configured as a repeater. If not, the packet is discarded. If it is configured as a repeater, the module determines whether there is an entry in the RRT with a matching source address, destination address and receive RRI. The packet is discarded if such an entry is not found. If such an entry is found, however, the module sets its busy filter and exception addresses for communication between source and destination devices, transmits a CEBus IACK, uses the transmit RRI in the matching RRT entry to modify the source device address field, and sets the repeat retry count to zero. The module then transmits, or repeats, the CEBus packet.

Next, the module determines whether a CEBus IACK has been received. If not, and if the retry repeat count is less than "N", where N is a configurable parameter in the RCM, the module again transmits or repeats the CEBus packet. If, on the other hand, a CEBus IACK has been received or if the retry count is not less than N, the module determines whether its Open Pipe bit is set to 1. If not, the busy filter and exception addresses are cleared and the process loops back to the beginning. The module then determines whether another CEBus packet has been received. Similarly, if the Open Pipe bit is set, the module loops back to the beginning of the process.

Figure 4B:
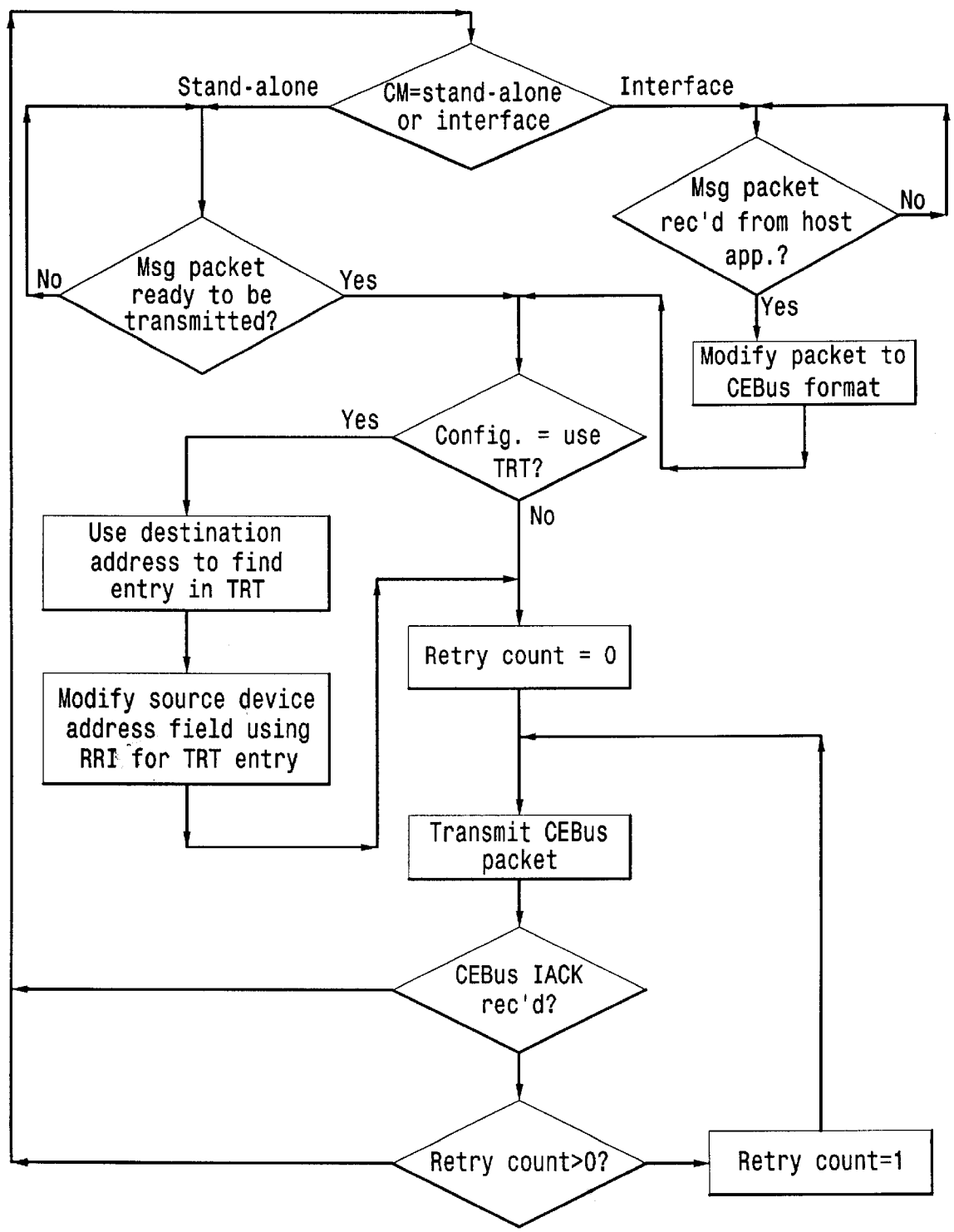
Figure 4B:
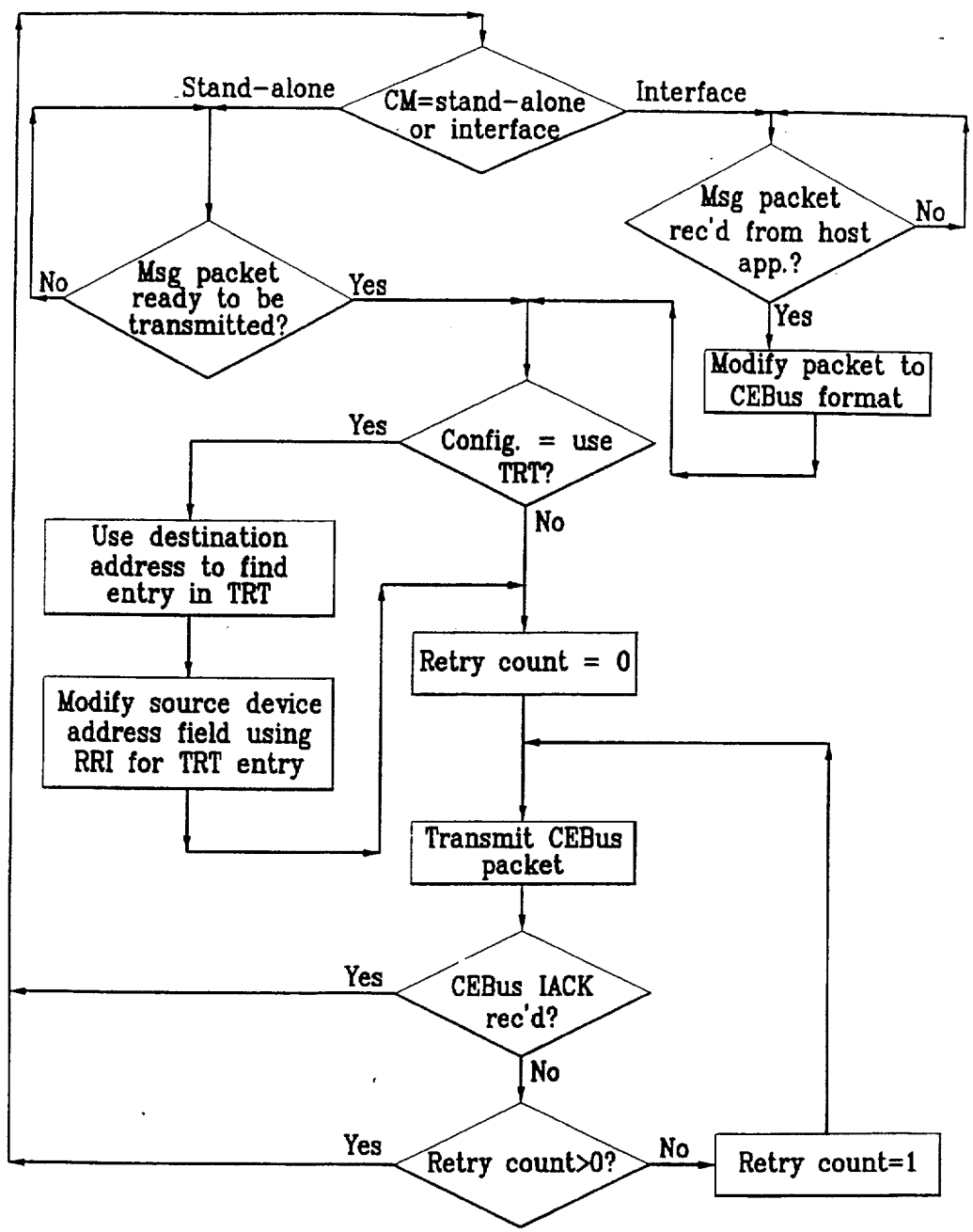

FIG. 4B illustrates the operation of the module in initiating, or transmitting, CEBus packets. As shown, the process begins with the module determining whether it is in a stand-alone or interface mode. If in a stand-alone mode, the process proceeds to the left in FIG. 4B and the module determines whether a message packet is ready to be transmitted. If a packet is ready for transmission, the process proceeds down the center branch of the flowchart. On the other hand, if the module is in the interface mode, the process proceeds to the right in the flowchart and the module determines whether a message packet has been received from the host application. If so, the module modifies the packet to place it in a correct CEBus format, and the process proceeds down the center branch of the flowchart.

As shown in the center branch of the flowchart, the module determines whether it has been configured to use the transmit role table, or TRT. If so, it uses the destination address to find an entry in the TRT, and then modifies the source device address field using the RRI for the TRT entry. After the latter two steps are performed, or if the module is not configured to use the TRT, the module sets the retry count to zero, transmits the CEBus packet, and then determines whether a CEBus IACK has been received. If a CEBus IACK has been received, the process loops back to the beginning. On the other hand, if the CEBus IACK has not been received, the module determines whether the retry count is greater then zero; if so, the process loops back to the beginning and, if not, the module sets the retry count to 1 and loops back to the step wherein the CEBus packet is transmitted.

EXAMPLE

The following example illustrates the action taken by repeaters during a message transfer between two devices. The devices shown in FIG. 2 are used for this example. Each device is identified by two addresses, as follows:

| Device | House Code | Device Address |
| --- | --- | --- |
| D1 | $000A | $0001 |
| D2 | $000B | $0002 |
| D3 | $000A | $0003 |

Device D1 has a 30-packet message which is to be sent to device D2. The RCM in device D1 is configured to transmit packets with an RRI. When the RCM receives the message, it first looks in its transmit role table to determine which RRI is to be inserted in each packet of the message. The three devices contain the following TRTs:

Device D1 Transmit Role Table

| Entry | Destination House Code | Destination Device Address | Transmit RRI |
| --- | --- | --- | --- |
| 1 | $000A | $0003 | %001 |
| 2 | $000B | $0002 | %010 |

Device D2 Transmit Role Table

| Entry | Destination House Code | Destination Device Address | Transmit RRI |
| --- | --- | --- | --- |
| 1 | $000A | $0001 | %010 |
| 2 | $000A | $0003 | %010 |

Device D3 Transmit Role Table

| Entry | Destination House Code | Destination Device Address | Transmit RRI |
| --- | --- | --- | --- |
| 1 | $000A | $0001 | %001 |
| 2 | $000B | $0002 | %010 |

Matching the destination addresses to entry #2 in the table, the RCM in device D1 finds that the RRI for the message is %010. The RCM inserts this RRI into the Source Device Address field as follows:

| unused | RRI | OP Bit | Actual CEBus Source Device Address |
| --- | --- | --- | --- |
| 0 | 010 | 1 | 00000000001 |

Prior to sending the 30 packet message, the RCM first sends the Open Pipe procedure to device D2. Notice that the Open Pipe bit in the Source Device Address field is set to '1'. This indicates to all repeaters involved in the message transfer that there are more packets to follow, and the repeaters in the chain are being asked to stay dedicated to the session between D1 and D2.

The two RCMs (contained in the electricity meters at residences 16a and 16b) contain the following repeater role tables:

Residence A Repeater Role Table

| Entry | Source House Code | Source Device Address | Dest. House Code | Dest. Device Address | Receive RRI | Trans. RRI |
| --- | --- | --- | --- | --- | --- | --- |
| 1 | $000A | $0001 | $000A | $0003 | %001 | %000 |
| 2 | $000A | $0001 | $000B | $0002 | %010 | %001 |
| 3 | $000A | $0003 | $000A | $0001 | %001 | %000 |
| 4 | $000A | $0003 | $000B | $0002 | %010 | %001 |
| 5 | $000B | $0002 | $000A | $0001 | %001 | %000 |
| 6 | $000B | $0002 | $000A | $0003 | %001 | %000 |

Residence B Repeater Role Table

| Entry | Source House Code | Source Device Address | Dest. House Code | Dest. Device Address | Receive RRI | Trans. RRI |
|---|---|---|---|---|---|---|
| 1 | $000A | $0001 | $000B | $0002 | %001 | %000 |
| 2 | $000A | $0003 | $000B | $0002 | %001 | %000 |
| 3 | $000B | $0002 | $000A | $0001 | %010 | %001 |
| 4 | $000B | $0002 | $000A | $0003 | %010 | %001 |

The Open Pipe procedure packet transmit by device D1 is received by both repeaters. The residence 16b repeater looks in its repeater role table and finds a match for the addresses but the receive RRI, or RRRI, is not a match, and so it ignores the message. The residence 16a repeater finds a complete match (entry #2), and so it sets a busy filter to allow only packets from devices D1 and D2 to be repeated. The repeater then takes the transmit RRI (TRRI) field formed with entry #2 (%001), inserts it into the received packet, and retransmits the packet. The Source Device Address field of the transmitted packet is:

| unused | RRI | OP Bit | Actual CEBus Source Device Address |
|---|---|---|---|
| 0 | 001 | 1 | 00000000001 |

The residence 16b repeater receives the packet transmit by the residence 16a repeater and finds a complete match in it's repeater role table (entry #1). It therefore sets a busy filter similar to the residence 16a repeater, changes the RRI in the received packet to %000 and re-transmits the packet. Because the packet contains an RRI=%000, the packet will be received and acted on by the destination device (device D2).

When device D2 receives the Open Pipe procedure it sends a response message back through the repeaters to device D1. The receipt of this message by device D1 indicates that the channel is dedicated, and the 30 packet message may be sent. Each packet of the message follows the same steps outlined above for the Open Pipe packet. When device D2 receives the last packet, it sends a one packet response message to device D1 to indicate that the message was successfully received. The Source Device Address field in the response message sent by device D2 is:

| unused | RRI | OP Bit | Actual CEBus Source Device Address |
|---|---|---|---|
| 0 | 010 | 0 | 00000000002 |

Notice that the Open Pipe bit in the response message packet is set to "0". This indicates to both repeaters involved in the transfer that their busy filters may be cleared after this packet is successfully passed to the next device in the message chain. The repeaters are now available for the next communication session.

While the present invention has been described and illustrated with reference to specific, presently preferred embodiments, those skilled in the art will recognize that modifications and variations may be made without departing from the principles of the invention as described above and set forth in the following claims. For example, except as they may be explicitly so limited, the claims are not restricted to embodiments of the invention in which the RCM is configurable as a host interface, repeater or standalone destination device. Thus, e.g., a repeater that is not capable of being reconfigured to act as a standalone device may be encompassed by the claims. The claims may also cover an RCM which is not specifically utilized in a CEBus network (although the invention is particularly useful in such a network). Other features of the preferred embodiments described above may be modified without substantially departing from the teachings set forth herein.

We claim:

1. A communications module comprising:
   (a) a processor that controls the reception from the host application, modification and transmission of message packets in accordance with a prescribed transmit role table (TRT); and
   (b) a memory operatively coupled to said processor and containing said TRT;
   wherein said TRT comprises a plurality of entries, wherein each entry comprises a destination house code, a destination device address, and a transmit repeater role identifier (TRRI), wherein said destination house code and destination device address identify a specific destination device and its house address, and wherein said module is capable, through said processor and TRT, of modifying said message packets to thereby determine a route to a destination device for each packet.

2. A communications module as recited in claim 1, wherein said communications module is operatively coupled to the host application, and wherein said processor is programmed to compare a first field within a packet received from the host application to said destination house codes, and to compare a second field within the packet received from the host application to said destination device addresses, and to copy the TRRI corresponding to the TRT entry having codes matching the destination house code and destination device address to a repeater role identifier (RRI) field in said packet, and then to transmit the packet, wherein the packet is to be received by a repeater or destination device depending upon the addresses and RRI contained in the packet.

3. A communications module as recited in claim 1, further comprising a repeater role table (RRT) stored in said memory, wherein said RRT is employed by said module when said module is functioning as a repeater.

4. A communications module as recited in claim 3, wherein said repeater role table comprises a plurality of entries, each said entry comprising a source house code, a source device address, a destination house code, a destination device address, a receive repeater role identifier (RRRI) and a transmit repeater role identifier (TRRI); wherein said source house code and source device address identify a specific source device and its house address, said destination house code and destination device address identify a specific destination device and its house address, and the RRRI identifies when the repeater is to respond to a message between the source and destination devices.

5. A communications module as recited in claim 4, wherein said processor is programmed to compare prescribed fields within the packet to said source house codes, source device addresses, destination house codes, and destination device addresses; to identify an RRT entry having matching source and destination address and house codes; to compare an RRI field in said packet to said RRRI in the identified entry; to ignore the packet if said RRI field does not match said RRRI in the identified entry; to ignore the packet if a matching set of device addresses and house codes is not found in the RRT; and, if said RRI field does match said RRRI in the identified entry, to insert the TRRI in said identified entry in said packet and to re-transmit the packet.

6. A communications module as recited in claim 1, wherein the module is configurable to function as a repeater, and said processor is programmed to act in response to an open pipe packet indicating an open pipe procedure as follows:

if the module is functioning as a repeater and determines that the open pipe procedure is to be repeated, the module sets a busy filter, sends an immediate acknowledgment (IACK) to a transmitting device, wherein the transmitting device may be a source device or a repeater, and then re-transmits the open pipe packet;

if the module is a source or destination device, once the open pipe procedure exchange is completed, the module sets an open pipe bit in all packets except the last packet of a response message, and, in the last packet of a response, the end of a normal message sequence is indicated by the clearing of the open pipe bit.

7. A communications module as recited in claim 1, wherein said module is programmable to function as a repeater for repeating message packets, as a standalone source device capable of initiating message packets, or as a device coupled to a host application and capable of transmitting message packets initiated by the host.

8. A repeater communications module (RCM) for repeating message packets, comprising:

(a) a processor that controls the reception and re-transmission of message packets in accordance with a prescribed repeater role table (RRT); and (b) a memory operatively coupled to said processor and containing said RRT;

wherein said RRT comprises a plurality of entries, each said entry comprising a source house code, a source device address, a destination house code, a destination device address, a receive repeater role identifier (RRRI) and a transmit repeater role identifier (TRRI); wherein said source house code and source device address identify a specific source device and its house address, said destination house code and destination device address identify a specific destination device and its house address, and the RRRI identifies the repeater which is to re-transmit the message packet; and wherein said processor is programmed to compare prescribed fields within a packet to said source house codes, source device addresses, destination house codes, and destination device addresses, and to determine whether to ignore the packet or to modify and transmit the packet.

9. An RCM as recited in claim 8, wherein said processor is programmed to compare prescribed fields within a packet to said source house codes, source device addresses, destination house codes, and destination device addresses; to identify an RRT entry having matching source and destination address and house codes; to compare an RRI field in said packet to said RRRI in the identified entry; to ignore the packet if said RRI field does not match said RRRI in the identified entry; and, if said RRI field does match said RRRI in the identified entry, to insert the TRRI in said identified entry into said packet and to transmit the packet.

10. A consumer electronics bus (CEBus) system comprising a plurality of repeater communications modules (RCMs) each of which is in communication with both an associated electricity meter of a residence and, via a communications medium, to at least one other RCM, wherein said RCMs are configurable to function as a repeater for repeating message packets, as a source device for initiating message packets, or as a device coupled to a host application for transmitting message packets initiated by the host, wherein at least one RCM comprises:

(a) first means for controlling the reception, modification and forwarding of message packets, wherein said first means operates in accordance with a transmit role table (TRT) when the RCM is functioning as a source or is coupled to and controlled by a host application and the host application is acting as a source;

(b) second means for receiving message packets and re-transmitting said message packets in accordance with a repeater role table (RRT) when the RCM is functioning as a repeater; and (c) a memory operatively coupled to said first and second means, wherein said memory stores said TRT and RRT.

11. A system as recited in claim 10, wherein said transmit role table comprises a plurality of entries, wherein each entry comprises a destination house code, a destination device address, and a transmit repeater role identifier (TRRI), wherein said destination house code and destination device address identify a specific destination device and its house address.

12. A system as recited in claim 11, wherein, when said RCM is a source device, said processor is programmed to compare a first field within the packet to said destination house codes, and to compare a second field within the packet to said destination device addresses, and to copy the TRRI corresponding to the TRT entry having a matching destination house code and destination device address to an RRI field in said packet, and then to transmit the packet.

13. A system as recited in claim 10, wherein said repeater role table comprises a plurality of entries, each said entry comprising a source house code, a source device address, a destination house code, a destination device address, a receive repeater role identifier (RRRI) and a transmit repeater role identifier (TRRI); wherein said source house code and source device address identify a specific source device and its house address, said destination house code and destination device address identify a specific destination device and its house address, and the RRRI identifies the repeater that is to re-transmit the message packet.

14. A system as recited in claim 13, wherein said RCM is programmed to compare prescribed fields within the packet to said source house codes, source device addresses, destination house codes, and destination device addresses; to identify an RRT entry having matching source and destination address and house codes; to ignore the packet if a matching set of device addresses and house codes is not found in the RRT; to compare an RRI field in said packet to said RRRI in the identified entry; to ignore the packet if said RRI field does not match said RRRI in the identified entry; and, if said RRI field does match said RRRI in the identified entry, to insert the TRRI in said identified entry in said packet and to re-transmit the packet.

15. A system as recited in claim 10, wherein re-transmission of a message packet by said RCM includes enhancing the packet.

16. A system as recited in claim 10, wherein the communications medium is a member of a group consisting of power line, twisted pair, coaxial cable and wireless media.

17. A system as recited in claim 10, wherein the RCM is integrated with a device or an appliance such that said device or appliance maintains its existing functionality while adding the capabilities of the RCM.

18. A system as recited in claim 10, wherein the system is configured to establish a complete end-to-end communication path between source and destination devices prior to transmission of a message, and wherein each RCM involved in a given communication session is dedicated to that session until the session is complete.

19. A system as recited in claim 10, wherein each communications module is programmed to dedicate itself to a message transfer between only a specified number of devices at a time by setting a busy filter, and to instruct other devices which attempt to use a communications module with a set busy filter to retry their message at a later time.

20. A system as recited in claim 10, wherein each communications module is programmed to retry messages which are known to have not reached a next communications module or destination device.

21. A system as recited in claim 10, wherein each communications module is programmed to use a channel access time of 8 CEBus unit symbol times (USTs) for repeat packets, whereby a repeated packet is given higher priority than that given to other packets.

22. A communications module (CM) for sending message packets via one or more repeaters and a communications medium to any of a plurality of destination devices, comprising:
 (a) a first processor means for communicating with a host application and controlling the reception, modification and transmission of message packets received from the host application in accordance with a first transmit role table (TRT);
 (b) a second processor means, which is not in communications with said host application, for generating a message packet and transmitting the message packet in accordance with a second transmit role table (TRT); and
 (c) a memory operatively coupled to said first processor means, wherein said memory stores said first TRT and provides access thereto to said first processor;
 wherein each said TRT comprises a plurality of entries, wherein each entry comprises a destination house code, a destination device address, and a transmit repeater role identifier (TRRI), wherein said destination house code and destination device address identify a specific destination device and its house address, and wherein said CM is capable of modifying said message packets to thereby determine a route to a specific destination device for each packet.

23. A communications module as recited in claim 22, wherein said communications module is operatively coupled to a host application, and wherein said first processor means is programmed to compare a first field within a packet received from the host application to said destination house codes, and to compare a second field within the packet received from the host application to said destination device addresses, and to copy the TRRI corresponding to the TRT entry having a matching destination house code and destination device address to an RRI field in said packet, and then to transmit the packet, wherein the packet is to be received by a repeater or destination device depending upon the addresses and RRI contained in the packet.

24. A method for operating a communications module having access to a prescribed transmit role table (TRT) that includes a plurality of entries, each entry comprising a destination house code, a destination device address, and a transmit repeater role identifier (TRRI), wherein said destination house code and destination device address identify a specific destination device and its house address, the method comprising the steps of:
 comparing a first field within a packet to said destination house codes;
 comparing a second field within the packet to said destination device addresses;
 copying the TRRI corresponding to the TRT entry having a matching destination house code and destination device address to a repeater role identifier (RRI) field in said packet; and
 transmitting the packet.

25. A method as recited in claim 24, wherein said communications module further has access to a repeater role table (RRT) containing a plurality of RRT entries, each said RRT entry comprising a source house code, a source device address, a destination house code, a destination device address, a receive repeater role identifier (RRRI) and a transmit repeater role identifier (TRRI), wherein said source house code and source device address identify a specific source device and its house address, said destination house code and destination device address identify a specific destination device and its house address, wherein the method further comprises the steps of:
 comparing prescribed fields within the packet to said source house codes, source device addresses, destination house codes, and destination device addresses of said RRT;
 identifying an RRT entry having matching source and destination address and house codes, and ignoring the packet if a matching set of device addresses and house codes is not found in the RRT;
 comparing an RRI field in said packet to said RRRI in the identified entry;
 ignoring the packet if said RRI field does not match said RRRI in the identified entry; and
 if said RRI field does match said RRRI in the identified entry, inserting the TRRI in said identified entry in said packet and transmitting the packet.

26. A method as recited in claim 25, further comprising responding to an open pipe packet indicating the initiation of an open pipe procedure as follows:
 if the module is functioning as a repeater and determines that the open pipe packet is to be repeated, the module sets a busy filter, sends an immediate acknowledgment (IACK) to the transmitting device, wherein the transmitting device may be a source device or a repeater, and then transmits the packet;
 if the module is a source or destination device, once an open pipe procedure exchange is completed, the module sets an open pipe bit in all packets except the last packet of a response message, and, in the last packet of a response, the end of a normal message sequence is indicated by the clearing of the open pipe bit.

* * * * *

UNITED STATES PATENT AND TRADEMARK OFFICE
CERTIFICATE OF CORRECTION

PATENT NO. : 5,978,371

DATED : November 2, 1999

INVENTOR(S) : Robert T. Mason, Jr. et al.

It is certified that error appears in the above-identified patent and that said Letters Patent is hereby corrected as shown below:

Please replace drawing sheet 3 with the attached replacement drawing sheet.

Signed and Sealed this

Sixth Day of June, 2000

Attest:

Q. TODD DICKINSON

Attesting Officer

Director of Patents and Trademarks